Patented May 10, 1938

2,116,634

UNITED STATES PATENT OFFICE 2,116,634

PROCESS OF MAKING ROLLED OATS CEREAL FLAKES

Delia Lyons, Corona, N. Y.

No Drawing. Application August 8, 1934, Serial No. 738,934

3 Claims. (Cl. 99—83)

This invention relates to an improved cereal, and its leading object is to provide a cereal in which rolled oats is produced in a flake form, and may be eaten without further cooking.

Rolled oats are known to have beneficial food values, and it is well known that more persons would eat rolled oats as a breakfast cereal, and for other purposes, if the time and effort required to prepare the rolled oats for the table could be eliminated, especially during the hot summer months, when every effort is made to avoid generating artificial heat.

The object of the present invention is to provide a rolled oats cereal, which may be served and eaten in a flake form, and which does not require, while in the flake form, any cooking or additional heat treatment.

My improved rolled oats is formed in the following manner: for each pound of rolled oats, a pint of water is used, and for flavoring and seasoning, one-half a teaspoonful of salt and two teaspoonsful of honey is added.

The water is boiled in a suitable container, and at the moment it reaches a boiling state the container is withdrawn from the heater, or the heater is extinguished. The salt and honey are then added to the water. Or the salt and honey may be added to the water during the period when it is being heated.

When the water has reached the state of boiling quick cooking rolled oats is added, and the mixture is rapidly stirred to produce a doughy mass. When this mass is of uniform composition it is shaped into a loaf form, of the desired cross section or size, and then allowed to harden. This requires several hours. The loaves may be allowed to remain over night, or the hardening process may be hastened by artificial heat, but baking action should be avoided, the heat, if used being of moderate temperature.

The hardened loaf, of the proper size or cross section, is then subjected to a shaving action, under a keen edged knife or instrument, so that it is cut up into very thin flakes of moderate size. If desired the loaf may be severed longitudinally to provide bars or narrow loaves of the required cross section, and these bars or narrow loaves may be given any suitable form.

The loaf or slices of the loaf are shaved so that the flakes will be paper-like in thickness. These flakes are placed in a shallow pan and slowly dried in an oven, at a moderate toasting temperature, with the oven door remaining open, to prevent the accumulation of steam from the vapor thus released. When the toasting action is finished the flakes are removed from the oven and allowed to cool, and then packaged and sealed air tight for public distribution.

The taste and general flavor of the improved cereal may be improved by reducing the amount of salt by one half, for a given quantity of material, and using approximately two teaspoonsful of honey for each one half teaspoonful of salt. The honey is added with the salt to the water before the precooked rolled oats is mixed with the water.

The honey improves the color, taste and strength of the flakes, and also aids in their preservation. The honey acts to bind the particles of the flakes to each other, so that thinner and tougher flakes can be formed, and also permits the material to be worked or united into a more compact condition, so that the flakes will be more uniform and pleasing. The honey also serves to increase the tendency of the flakes to curl when toasted, so that their crispiness is also improved. The color of the flakes is also improved by the use of honey.

Having described my invention I claim as new:—

1. The process of forming cereal flakes edible without additional cooking from rolled oats, consisting in immersing rolled oats in boiling water and mixing the mass to form a doughy composition, shaping the mass into predetermined form and allowing the same to harden, shaving the hardened mass to produce paper thin flakes, and drying the flakes by a heat toasting action.

2. The process of forming edible flakes, consisting in combinating rolled oats with boiling water and honey, mixing the mass to form a doughy mixture, shaping the mass into predetermined form, allowing the mass to then harden, shaving the mass to form paper-like flakes, and then subjecting the flakes to a toasting operation in the presence of heat.

3. The process of making a quickly edible oat meal breakfast food, consisting in placing rolled oat in boiling water, mixing the mass to secure a doughy mixture and allowing the same to harden, producing shavings from the hardened mass, slicing to form thin flakes, and then toasting the flakes in the presence of heat.

DELIA LYONS.